(12) United States Patent
Veldkamp et al.

(10) Patent No.: US 11,317,634 B2
(45) Date of Patent: May 3, 2022

(54) INTERCHANGEABLE HOOK-AND-BRACKET SYSTEM

(71) Applicants: Marel, Inc., Lenexa, KS (US); Marel Further Processing B.V., Boxmeer (NL)

(72) Inventors: Brent M. Veldkamp, Lenexa, KS (US); Tim Weers, Lenexa, KS (US); Mattheus Catharina Willems, Lenexa, KS (US); Johannes Martinus Meulendijks, Boxmeer (NL)

(73) Assignee: MAREL FURTHER PROCESSING B.V., Boxmeer (NL)

( * ) Notice: Subject to any disclaimer, the term of this patent is extended or adjusted under 35 U.S.C. 154(b) by 238 days.

(21) Appl. No.: 16/818,077

(22) Filed: Mar. 13, 2020

(65) Prior Publication Data
US 2021/0282417 A1  Sep. 16, 2021

(51) Int. Cl.
*A22C 15/00* (2006.01)
*A22C 11/00* (2006.01)
*A22C 17/10* (2006.01)

(52) U.S. Cl.
CPC .......... *A22C 15/002* (2013.01); *A22C 11/008* (2013.01); *A22C 17/10* (2013.01)

(58) Field of Classification Search
CPC ................................. A22C 15/02; A22C 17/10
USPC .......................................................... 452/51
See application file for complete search history.

(56) References Cited

U.S. PATENT DOCUMENTS

| 2,553,133 A * | 5/1951 | Conner ................. | B65G 17/20 |
| | | | 198/682 |
| 2,672,230 A * | 3/1954 | Jetzke ...................... | B66C 1/34 |
| | | | 198/682 |
| 2,708,999 A * | 5/1955 | Rush ...................... | B65G 17/20 |
| | | | 198/682 |

(Continued)

FOREIGN PATENT DOCUMENTS

DE    102014105767 A1    10/2015
EP        0482368 B1     3/1996
(Continued)

OTHER PUBLICATIONS

Extended European Search Report from corresponding EP Application No. EP20163129.8, dated Aug. 26, 2020.
(Continued)

*Primary Examiner* — Richard T Price, Jr.
(74) *Attorney, Agent, or Firm* — Workman Nydegger

(57) ABSTRACT

An interchangeable hook-and-bracket system for a manufacturing process is disclosed. The interchangeable hook-and-bracket system may be configured to cooperate with a vertical conveying system of a food-processing system. Interchangeable hooks of the conveyor system may comprise hook portions and bracket portions that may be configured to releasably attach to one another. The bracket portions may be made substantially of a structurally robust material such as a metal and may be non-releasably attached to the conveyor system, and the hook portions may be made substantially of a flexible material such as a polymer-based material. More than one hook portion may correspond to a bracket portion, each hook portion having a configuration corresponding to a particular product, casing, throughput, and/or process condition.

20 Claims, 6 Drawing Sheets

(56) References Cited

U.S. PATENT DOCUMENTS

| | | | | |
|---|---|---|---|---|
| 2,868,354 | A | * | 1/1959 | Harrison ............... B61B 10/025 198/465.4 |
| 3,218,018 | A | | 11/1965 | Pusch et al. |
| 3,500,494 | A | * | 3/1970 | Kopp ..................... A22B 5/161 452/183 |
| 3,596,749 | A | * | 8/1971 | Altenpohl, Jr. ...... B65G 17/485 198/377.06 |
| 3,820,195 | A | * | 6/1974 | Hutzell .................. A22B 7/007 452/187 |
| 3,926,303 | A | | 12/1975 | McCall |
| 4,069,790 | A | * | 1/1978 | Witte ..................... B05B 5/082 118/500 |
| 4,182,004 | A | * | 1/1980 | Haring, Jr. ........... A22C 15/003 452/187 |
| 4,187,945 | A | * | 2/1980 | Altenpohl ................ B07C 5/22 209/592 |
| 4,233,709 | A | * | 11/1980 | Smith .................... A22C 11/00 452/177 |
| 4,532,858 | A | | 8/1985 | Hershfeld |
| 5,085,612 | A | | 2/1992 | Muller |
| 5,163,864 | A | | 11/1992 | Burger et al. |
| 5,354,229 | A | | 10/1994 | Markwardt et al. |
| 5,404,992 | A | * | 4/1995 | Robu ................... B65G 19/025 198/465.4 |
| 5,799,769 | A | * | 9/1998 | Heer .................... B65G 19/025 198/349 |
| 6,092,644 | A | * | 7/2000 | Gartner ................. B65G 47/61 198/370.01 |
| 6,125,991 | A | | 10/2000 | Veldkamp et al. |
| 6,523,462 | B1 | | 2/2003 | Johnson et al. |
| 6,592,452 | B1 | * | 7/2003 | Myers .................... A22C 11/00 452/51 |
| 7,195,552 | B1 | | 3/2007 | Johnson et al. |
| 7,520,802 | B1 | | 4/2009 | Veldkamp et al. |
| 7,618,307 | B2 | * | 11/2009 | Gladh ................ A22C 11/104 452/51 |
| 9,480,264 | B2 | | 11/2016 | Schmid |
| 2004/0118302 | A1 | | 6/2004 | Muller |
| 2006/0060451 | A1 | * | 3/2006 | Golias ................... B65G 17/20 198/465.4 |
| 2007/0184768 | A1 | | 8/2007 | Sorensen et al. |
| 2011/0130082 | A1 | | 6/2011 | Knodel |
| 2011/0186405 | A1 | * | 8/2011 | Blanc .................... B65G 47/61 198/413 |
| 2013/0240335 | A1 | * | 9/2013 | MacLachlan .......... B65G 17/08 198/853 |
| 2020/0337320 | A1 | * | 10/2020 | Waldstadt .............. B65G 17/38 |

FOREIGN PATENT DOCUMENTS

| | | |
|---|---|---|
| EP | 1310171 A1 | 5/2003 |
| EP | 1430779 A1 | 6/2004 |
| EP | 1177724 B1 | 4/2005 |
| GB | 1428586 | 3/1976 |
| WO | 9817119 A1 | 4/1998 |

OTHER PUBLICATIONS

Extended European Search Report from corresponding EP Application No. EP20163093.6, dated Sep. 11, 2020.

* cited by examiner

INTERCHANGEABLE HOOK-AND-BRACKET SYSTEM

FIELD OF THE DISCLOSURE

The disclosure relates to an interchangeable hook-and-bracket system for a manufacturing process, particularly a food-manufacturing process such as sausage production.

BACKGROUND

Manufacturing processes, such as food-manufacturing processes, often involve high throughputs and complex machinery. The production of sausages, for instance, requires a number of complex operations to cooperate simultaneously at throughputs upward of 30,000 sausages per hour. The operation of such equipment requires high reliability and maximum efficiency.

Many manufacturing processes involve a conveyor belt or chain that transports products from one stage of the process to another stage of the process. Sausage-manufacturing processes, for instance, often utilize a conveyor that comprises a plurality of hooks. The hooks may be sized and shaped for engaging a link of sausage, and for forming loops comprising a plurality of links.

The conveyor may transport the links of sausage to further processing steps, include smoking, brining, or cooking steps, as appropriate. Certain conveyors and hooks cooperating therewith are often configured to permit a smoke stick to pass through and engage the loops of sausage links, as discussed in U.S. Pat. No. 7,520,802, granted Apr. 21, 2009, which is incorporated herein by reference in its entirety and owned by the assignee of the present disclosure. After engaging the loops, the smoke stick then disengages and removes the loops of sausage links from the hooks of the conveyor. In view of the need for maximum throughput and even/consistent distribution of smoking of the sausage links, the hooks of the conveyor are typically sized and configured to maximize the number of loops and links of sausage that can be fitted onto a smoke stick (ideally an entire casing of sausage links is fit onto a single smoke stick) while maintaining an even distribution with spaces between the individual links and loops.

In extrusion food processing, elongate strands of food material, such as sausages, are made using high-speed machines for extruding food material (such as a ground meat paste) into an elongated casing from which one or more sausages may be made. The filled casings are twisted to create a strand of sausage links which may be looped around the hooks of a conveyor system.

In view of the large variety of types of sausage links and other food products that can be made from a single food-processing system or other manufacturing process in response to changing demand or on different shifts, for example, the hooks are often sized for a specific product, the size and particularly the diameter of which determines the distribution on a smoke stick. Fewer sausages of a larger diameter may be fitted on a smoke stick relative to smaller-diameter sausages, for instance. Further, the shape of the plurality of hooks of the conveyor system are sized and configured based on the size of the sausage links to facilitate the formation of loops having a shape that corresponds to and permits the insertion of and engagement with a smoke stick.

Because of the variability of products and product dimensions, the configuration of a conveyor comprising a plurality of hooks to transport products is of concern, as a system used for preparing different products must be reconfigured for the particular dimensions of the different products. This is often labor-intensive and expensive, in terms of the down-time for a production facility, and in terms of capital investment and labor required to enact the reconfigurations. Generally, with existing food-processing devices, an entire conveyor system (including chain and hooks) must be switched out and replaced each time a product type or casing type is changed, as the metal hooks are not configured to be readily disengaged from the chain, for example to prevent unintended disengagement of the hooks from the chain during operation. While many different hook shapes exist for different products, this only adds to the cost, complexity, and operating burden of adjusting a food-processing device for particular products.

Existing food-manufacturing processes that commonly include conveyors with hooks that operate and translate in a horizontal plane may be poorly suited to cooperating with a sausage-making process, as individual sausage links are traveling in a different direction than the hooks, resulting in collisions between the hooks and the sausage links. Particularly at high throughputs and speeds, this can lead to bouncing and misalignment between the sausage links and the hooks or even disengaging a strand or casing of links from the conveyor and system altogether. To avoid this, the food-manufacturing process must be run at a lower speed and lower throughput, reducing the efficiency and profitability of a food-processing system.

While attempts have been made to remedy the problem of horizontally operating conveyors having to be operated at reduced speeds and throughputs by providing vertically operating conveyors, the existing vertically operating conveyors comprise hooks that are spaced close to each other in an effort to maximize placement of sausage links on a single smoke stick. This is intended to increase throughput.

However, this requires the use of metal hooks (which have the advantage of being strong and precisely bendable/malleable to a desired configuration), but metal hooks also have the disadvantage of being sharp (an issue when handling recently processed sausages having uncured and frequently delicate casings) and of deforming over time, with a result of a plurality of differently shaped hooks forming the conveyor. The shape of the hooks is a critical factor in the throughput of a food-processing device incorporating such a conveyor system, as the shape of the hooks affects the speed at which the sausages can be looped thereon and the reliability of doing so, which varies from product to product and based on casings and other process conditions.

Accordingly, the problem of existing food-manufacturing systems and other processes having metal hooks that are poorly suited to handle delicate and/or high-value products, and the difficulty of switching out hooks based on the particular process requirements, are problems for which there is currently no satisfying solution.

From the foregoing, there is a need for an improved hook system for conveyors for improved efficiency and reliability in manufacturing facilities.

SUMMARY

The interchangeable hook-and-bracket system embodiments of the present disclosure advantageously address the problems of existing manufacturing processes being poorly adapted to reliably handle products, such as food products, and being difficult to adapt to different product and process requirements, by providing an interchangeable hook-and-bracket system that provides both the connection strength of metal or rigid brackets and the structural advantages and interchangeability of flexible or polymer-based hooks that are configured to releasably attach to the metal brackets.

In an embodiment, a vertical conveyor (that is, a conveyor in which the chain and hooks travel in and through the vertical plane) may attach to or comprise brackets that provide a secure and robust attachment to the conveyor. The brackets may be substantially formed of a suitably robust material such as metal, including aluminum, iron, steel, stainless steel, brass, copper, nickel, titanium, combinations thereof, or other suitable metals and alloys. Other materials such as synthetic, composite, fiber- or glass-filled polymers, including but not limited to carbon fiber, are also contemplated. In embodiments, the metal bracket is configured with a head portion and a main body portion depending from the head portion. The head portion may define one or more apertures or other attachment features for attaching to the conveyor system, such as at rollers or links of a chain. The main body portion may be configured to cooperate with a hook portion and to releasably attach thereto. A hook portion and a bracket portion together may define an interchangeable hook-and-bracket according to the disclosed embodiments.

A plurality of hook portions may be configured to cooperate with and releasably, attach to the bracket portions. The plurality of hook portions may be formed of a polymer-based or other suitable material and may be shaped and configured to address the problem of existing conveyors being poorly suited to consistently, efficiently, and safely handling products such as uncured sausages. The polymer-based hook portions advantageously mitigate the problem of metal hooks being sharp and deforming over time, as the polymer-based hook portions may be flexible relative to the metal bracket portions, and/or may be provided with blunt or rounded edge portions, and/or may resist deformation over time.

One or more of the plurality of hook portions may comprise a main body portion, an extending portion, and an end portion, with a notch defined between the extending portion and the end portion. The hook portions may further comprise one or more engagement features for reliably and releasably attaching to a corresponding bracket portion.

The hook portions may be configured to be interchangeable, such that the hook portions may be replaced based on a different product or process requirement, without removing the corresponding bracket portion from the conveyor. This improves the ease and convenience with which a food-processing system, for example, can be adapted based on a process requirement without sacrificing the strength of the connection between the hook portions and the conveyor, as the structural strength of the bracket portions is not affected or compromised. This further reduces the cost of providing conveyor systems that correspond to each particular process and product requirement in view of reduced material costs and process downtime. Multiple hook portions, each suitable for a different process condition and/or product, may correspond to a single bracket portion, allowing the hook portions to be readily interchanged on the bracket portion as suitable for a product or process requirement.

The bracket portions and hook portions may be configured to provide an indicator to an operator when the bracket portion and corresponding hook portion are in an engaged configuration. In embodiments, the bracket and corresponding hook portions may define engagement features that provide a snap-in or click feature that provides an audible noise or other sensation confirming the engaged configuration for further ease, convenience, and intuitiveness of the interchanging process.

An exemplary manufacturing system of which the interchangeable hook-and-bracket system embodiments of the present disclosure may be part is shown in FIG. 1, and reference is made to co-pending application Ser. No. 16/818,040, filed Mar. 13, 2020, which is incorporated in its entirety by reference and owned by the assignee of the present disclosure. The interchangeable hook-and-bracket system embodiments may advantageously allow for a food-processing system as described in co-pending application Ser. No. 16/818,040, including a metering pump, a linker, and a conveyor. The metering pump may include and cooperate with an extruder that conveys a food material into an elongate casing material. The linker may comprise a rotatable chuck, linking belts, and pinching elements that create a strand of individual links from the stuffed elongate casing. A looper or discharge horn may then convey the linked strand to the conveyor in a throwing motion at a discharge angle.

Whereas in existing horizontal-conveyor systems the direction of travel of the conveyor may be opposed to or offset relative to the discharge angle of the discharge horn, resulting in lower throughput and slower speeds to avoid collisions/bouncing, the conveyor of the interchangeable hook-and-bracket system may be arranged as a vertical conveyor that is operated to travel in the vertical plane and in a direction and speed that coincides with a discharge angle and speed of the discharge horn, reducing collisions and minimizing disruptions to the operation of the food-processing system. This facilitates higher throughput and better efficiency generally of the food-processing system.

Thus by providing an interchangeable hook-and-bracket system according to the embodiments of the present disclosure, the problems of conveyors and hooks in existing manufacturing processes and systems being poorly adapted to handle products including food products, and being difficult to adapt to different product and process requirements, and therefore being inefficient and costly, are addressed.

Other methods, embodiments, and variations of the system are described in greater detail in the following discussion.

BRIEF DESCRIPTION OF THE DRAWINGS

These and other features, aspects, and advantages of the present invention will become readily apparent and better understood in view of the following description, appended claims, and accompanying drawings.

Figure 1A:
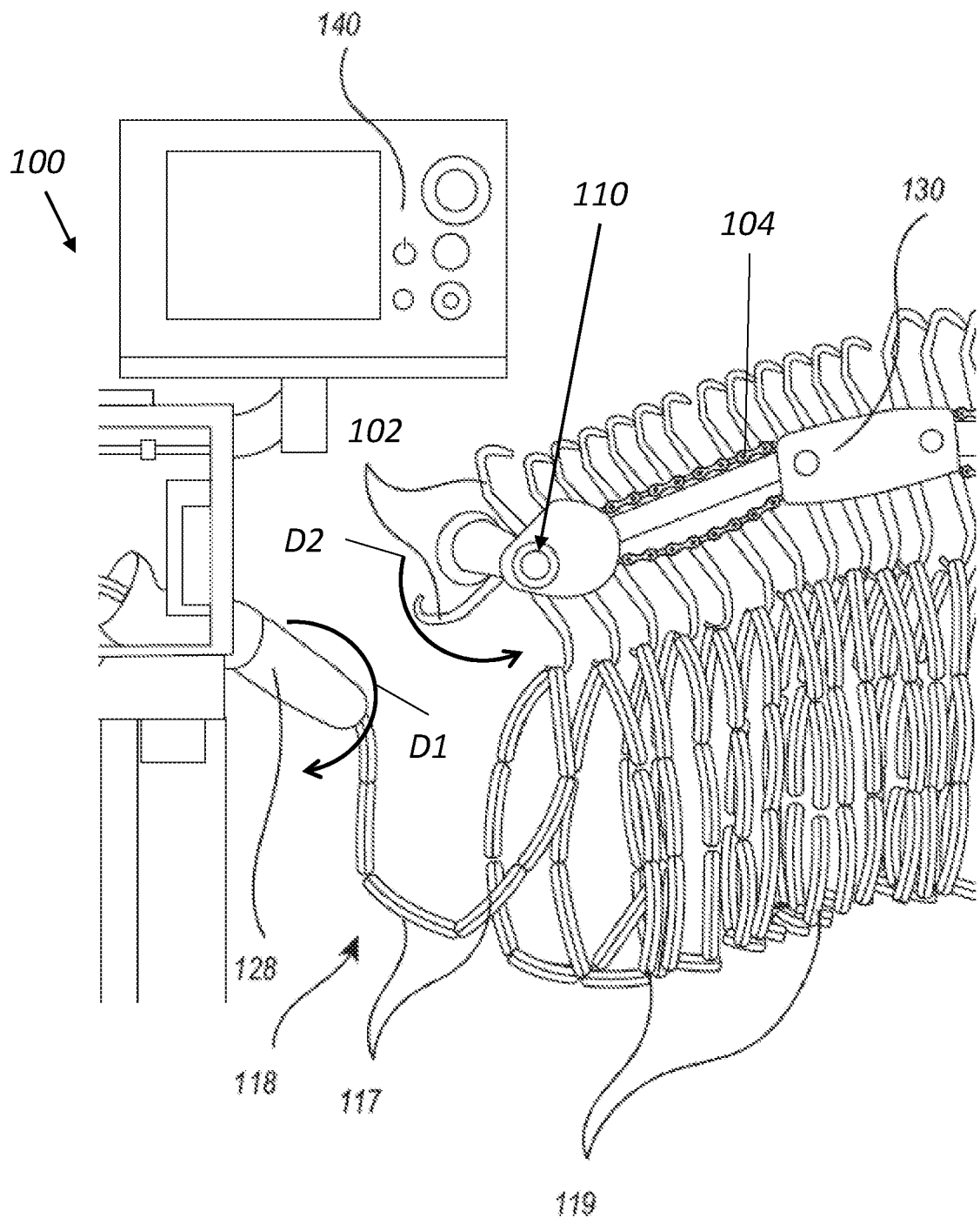
FIG. 1A is an elevational view of an interchangeable hook-and-bracket conveyor system cooperating with a food-processing system according to an embodiment of the disclosure.

The drawing figures are not necessarily drawn to scale, but instead are drawn to provide a better understanding of the components, and are not intended to be limiting in scope, but to provide exemplary illustrations. The figures illustrate exemplary configurations of interchangeable hook-and-bracket systems, and in no way limit the structures, configurations or functions of interchangeable hook-and-bracket system embodiments according to the present disclosure.

DETAILED DESCRIPTION OF VARIOUS EMBODIMENTS

A better understanding of different embodiments of the invention may be had from the following description read with the accompanying drawings in which like reference characters refer to like elements.

The problem of existing manufacturing systems being inefficient, difficult to configure to process and product requirements, and inconsistent due to metal brackets on a conveyor deforming over time and being ill-suited to products such as uncured sausages is addressed by the interchangeable hook-and-bracket system embodiments of the disclosure.

As used herein, "forward" or "forwardly" may refer to a direction in which the hooks of a conveyor system travel. "Backward" or "backwardly" may refer to an opposed direction of travel of the hooks of the conveyor system. "Upward" or "upwardly" and "downward" or "downwardly" may have their ordinary meaning and indicate a vertical direction either away from the ground or toward the ground, respectively.

While the disclosure is susceptible to various modifications and alternative constructions, certain illustrative embodiments are shown in the drawings and will be described below. It should be understood, however, there is no intention to limit the disclosure to the embodiments disclosed, but on the contrary; the intention is to cover all modifications, alternative constructions, combinations, and equivalents falling within the spirit and scope of the disclosure and defined by the appended claims.

An interchangeable hook-and-bracket system according to the disclosed embodiments may be configured to cooperate with a manufacturing process, such as an extruded food-manufacturing system, as described in co-pending application no. XX/000,000. FIG. 1A shows an interchangeable hook-and-bracket or conveyor system 130 configured with a food-processing system TOO. The food-processing system 100 may be a sausage-making system that distributes strands 118 of linked sausages from a discharge horn 128 that rotates as described in application no. XX/000,000. The discharge horn 128 may rotate in a direction D1, for example. The conveyor system 130 may be a vertical conveyor system that rotates in a direction D2 through the vertical plane, with a chain 104 and hooks 102 arranged vertically of each other. While a rotating discharge horn is depicted, it will be appreciated that any suitable discharge horn, including a discharge horn that does not rotate and/or is stationary, is contemplated.

The direction D2 and speed of the vertical conveyor system 130 may be arranged to cooperate with the rotation direction D1 and speed of the discharge horn 128 such that as a hook 102 of the conveyor system 130 approaches the discharge horn 128, the hook 102 and the discharge horn 128 are moving in substantially a same direction, e.g. downward. This advantageously reduces the risk of collisions and bouncing, in which the strand 118 may bounce off or deflect from the hook 102, which is particularly problematic in horizontally oriented conveyor systems.

Collisions and bouncing can cause the strand to fall away from the conveyor, leading to process downtime, lost product, and increased costs. Thus a sausage link may be more gently placed upon a corresponding hook of the conveyor with less of a change in momentum. By mitigating collisions and bouncing, the food-processing system 100 suffers from fewer process interruptions and achieves greater efficiency. It will be appreciated that the vertical conveyor system 130 is merely exemplary, and the conveyor system 130 may alternatively be a horizontal conveyor system configured to travel or move through a horizontal plane. Additionally or alternatively, the conveyor system may be a magnetic conveyor system.

As described in application no. XX/000,000, the strands 118 may define individual sausage links 117 which may be suspended from the hooks 102 such that loops 119 are defined. The loops 119 may be defined at each hook 102. The configuration of the loops 119 may be sized for the insertion of a smoke stick, which may preferably engage an entirety of the strand 118 and then remove the strand 118 from the hooks 102 for further processing, i.e. a smoking step. As discussed above, the disposition of the strand 118 to a smoke stick requires that the strand 118 contacts the smoke stick with maximal efficiency (i.e. the highest number of links on the smoke stick) while ensuring that space exists between each loop 119 for even treatment of the links 117.

The food-processing system 100 may comprise a controller that controls the rate and direction of rotation of the discharge horn 128 and the conveyor system 130, as well as the throughput of sausages to the discharge horn 128, such that the loops 119 are properly placed for a particular process, which may depend on the dimensions of the product and associated process conditions. For sausage production, the food-production system 100 may be capable of producing numerous types of sausages of varying compositions, casings, diameters, lengths, and other properties.

The conveyor system 130 configured as an interchangeable hook-and-bracket system according to embodiments of the disclosure may enable the food-processing system 100 to produce and accommodate such varying products by providing a plurality of interchangeable hooks 102 that comprise bracket portions on the conveyor system 130 and hook portions arranged to releasably connect therewith. In embodiments, the interchangeable hooks may comprise at least one bracket portion and more than one hook portion corresponding to the bracket portion. The interchangeable hook portions thus may each correspond to a particular product and provide improved product-handling capabilities, while the cooperating bracket portions provide needed structural strength and ease of replacing the hook portions as the process requirements vary.

Thus, instead of providing a plurality of conveying systems (including separate chains and brackets that must be swapped out and replaced) for each product, casing type, and process requirement, a single conveyor system, including a single chain and set of bracket portions, can be provided, and a plurality of interchangeable hook portions that correspond to the different products, casing types, throughputs, and process requirements is provided. The hook portions may be simply, intuitively, and quickly attached to and detached from the bracket portions for adjustment of the food-processing system 100 to a desired process condition.

In the conveyor system 130 the chain 104 may operate as a conveyor to which the interchangeable hooks 102 may be attached. The conveyor system 130 may be actuated in the rotation direction D2 by an actuator 110, which may be controlled by the controller of the food-processing system 100 in accordance with process requirements pertaining to the type of product being made and in view of the operation of the discharge horn 128. The actuator 110 may be an electric motor or any other suitable actuator.

Figure 1B:
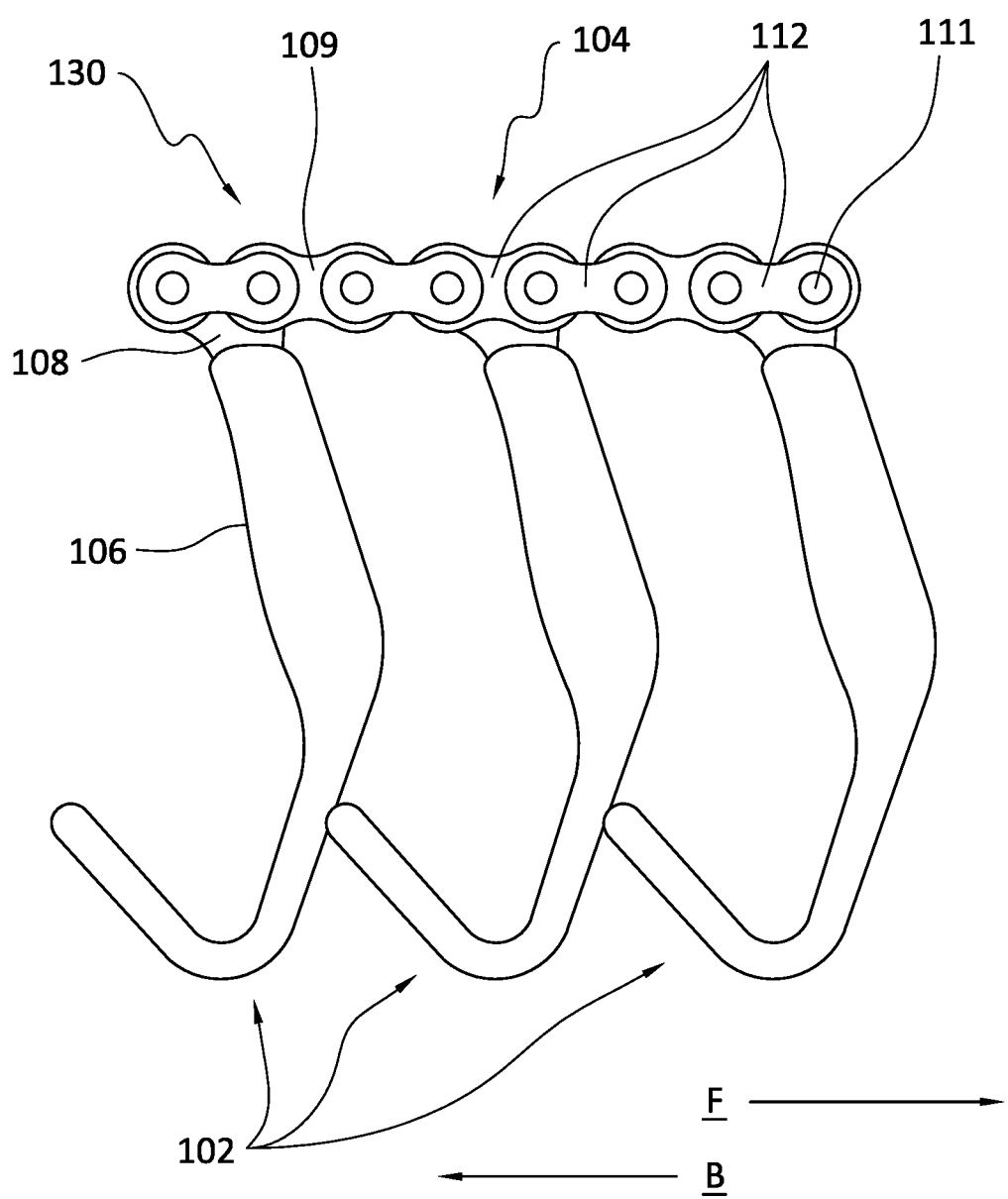
FIG. 1B is a simplified elevational view of the interchangeable hook-and-bracket conveyor of the embodiment of FIG. 1A.

Turning to FIG. 1B, the chain 104 of the conveyor system 130 may comprise a plurality of links 112, 109. Certain of the links 112, 109 may be outer links 112, and certain of the links 109 may be inner links 109, which may alternate with the outer links 112 as shown in FIG. 1B. The links 112, 109 may attach to each other at rollers 111. While a chain 104 comprising outer and inner links 112, 109 connected by rollers 111 is shown and described, it will be appreciated that any suitable conveyor system may be utilized, including but not limited to flat belt conveyors, modular belt conveyors, cleated belt conveyors, wire mesh belts, curved, inclined or declined conveyors, or any other suitable type of conveyor.

The conveyor system 130 comprises, as discussed, a plurality of interchangeable hooks 102. The hooks 102 each may comprise an interchangeable hook portion 106 and a bracket portion 108. The bracket portion 108 may be attached at predetermined intervals along the chain 104, such as at a regular alternating pattern along the chain 104. The interchangeable hook portion 106 may be formed of a different material and have different properties relative to the bracket 108, as will be described in greater detail herein.

Figure 2:
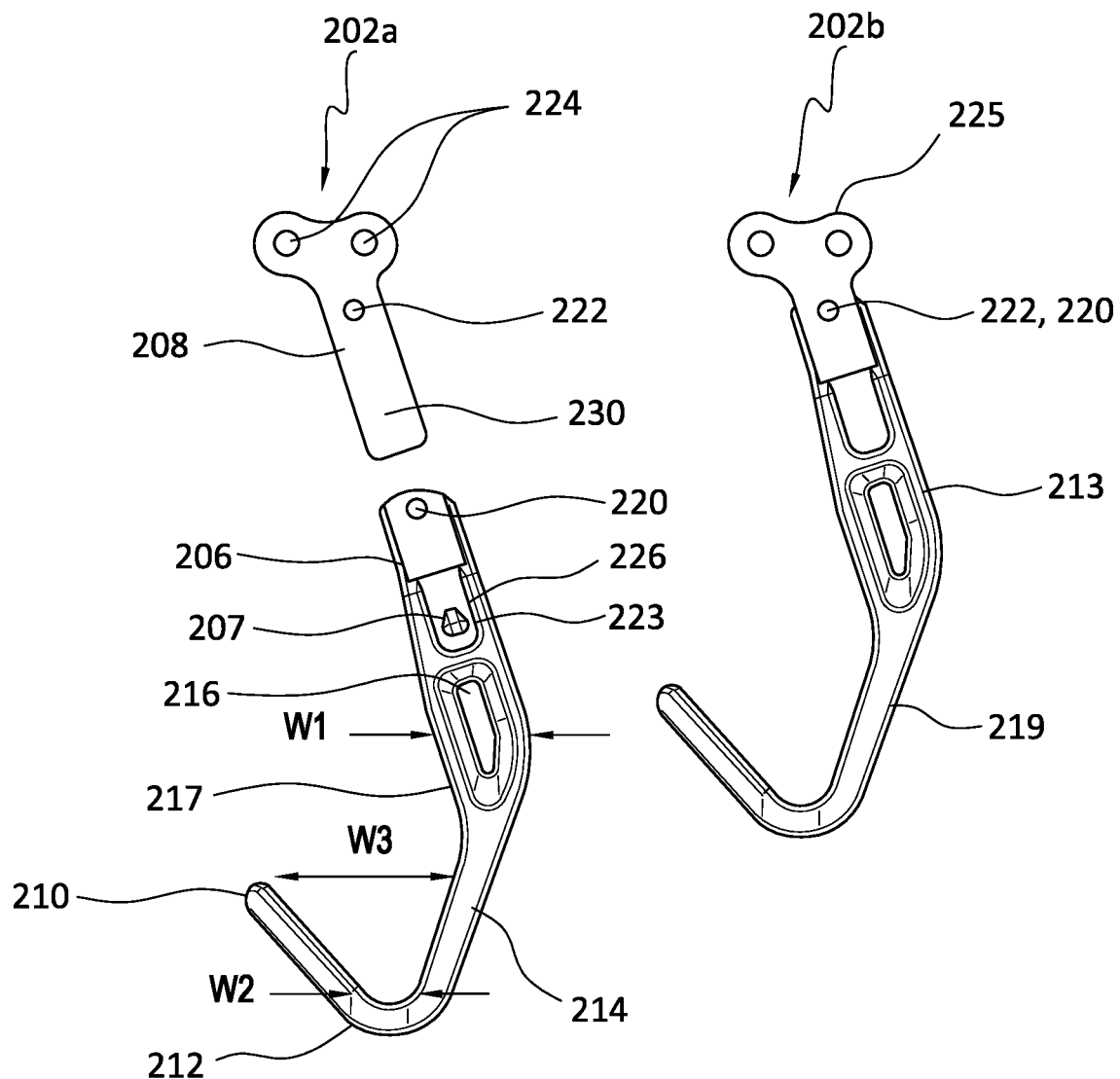
FIG. 2 is a schematic view of an interchangeable hook-and-bracket system according to an embodiment.

Turning to FIG. 2, the interchangeable hooks of the conveyor system are shown in schematic view, with an interchangeable hook 202a shown in exploded or detached view, and an interchangeable hook 202b shown in an attached view. The hooks 202a, 202b each may comprise an interchangeable hook portion 206 that cooperates with a bracket portion 208. The bracket portion 208 may be formed of a material that provides structural security and robustness to the hook 202a, 202b. The bracket portion 208 may comprise a metal, such as aluminum, steel, stainless steel, titanium, brass, copper, alloys or combinations thereof in any suitable proportions, or any other suitable material. In other embodiments, the bracket portion 208 may comprise a glass- or fiber-filled polymer material or synthetic material, or combinations of suitable materials. The bracket portion 208 may be substantially rigid.

The bracket portion 208 may be configured to attach to the chain 104 in any suitable manner. For example, the bracket portion 208 may comprise a head portion 225 distinct from a main body portion 230 that depends from the head portion 225. The head portion 225 may define one or more apertures 224 extending at least partially through a thickness of the bracket portion 208. The apertures 224 may be sized to cooperate with and engage the rollers 111 of the chain 104, allowing the hooks 202a, 202b to engage securely and substantially non-removably with the chain 104. By so attaching to the chain 104, the bracket portion 208 advantageously provides necessary strength and structural support to the hooks 202a, 202b.

As used herein, "non-removably" may refer to a connection that is not configured for repeated and intentional disconnection and reconnection during ordinary use. "Removably" or "releasably" may refer to a connection that is configured for repeated and intentional disconnection and reconnection by an operator during ordinary use.

The bracket portion 208 may further define an engagement feature allowing the bracket portion 208 to releasably cooperate with the interchangeable hook portion 206. The engagement feature may be an aperture 222 defined through a thickness of the main body portion 230 of the bracket portion 208. The aperture 222 may be sized and shaped to cooperate with a corresponding engagement feature on the interchangeable hook portion 206. In embodiments, the engagement feature on the interchangeable hook portion 206 may be a protrusion or resilient element 220.

The resilient element 220 may be a button that is configured to be depressed by the main body portion 230 of the bracket portion 208 as the bracket portion 208 is pressed into the interchangeable hook portion 206 (or vice versa) to engage the bracket and hook portions 208, 206 in an engaged configuration (similar to the hook 202b). The resilient element 220 may resiliently extend into the aperture 222 when the aperture 222 is aligned with the resilient element 220. The resilient element 220 may extend above a surface of the bracket portion 208 in an engaged configuration of the hook 202b, such that an operator may depress the resilient element 220 in order to intentionally disengage the bracket portion 208 and the interchangeable hook portion 206.

While the engagement features of the bracket portion 208 and the hook portion 206 are shown and described in the disclosed embodiment as a resilient element 220 and corresponding aperture 222 in the disclosed locations and sizes, it will be appreciated that any suitable engagement feature may be used to engage the bracket and the interchangeable hook portions. In embodiments, frictional features, locking elements, and other features may be used, as will be discussed in greater detail below.

The interchangeable hook portion 206 may comprise a main body portion 213, an extension portion 214, and an end portion 210. The extension portion 214 and the end portion 210 may define a notch 212 therebetween at a junction thereof. In embodiments, the notch 212, the extension portion 214, and the end portion 210 may be arranged to define a V-shape. It will be appreciated that a V-shape is merely exemplary, and the hook portion 206 may define any suitable configuration.

The interchangeable hook portion 206 may define a trailing edge 217 that defines a rounded or blunted shape. In embodiments, the trailing edge 217 may comprise a greater thickness than a leading edge 219. The rounded, blunted, or increased-width trailing edge 217 may advantageously address the problem of existing metal hooks damaging products by being sharp or otherwise ill-suited to certain applications such as transporting uncured, delicate links of sausage in a sausage-production system 100.

The main body portion 213 may define a channel 223 at least partially through a thickness of the hook portion 206, the channel 223 being configured to receive the main body portion 230 of the bracket portion 208. The channel 223 serves to further engage the bracket and hook portions 208, 206. To define the channel 223, the main body portion 213 and the hook portion 206 generally may have a thickness greater than a thickness of the bracket portion 208. The channel 223 may terminate at a stop-forming portion (not shown) to define a maximal insertion depth of the bracket portion 208.

The hook portion 206 may comprise a different material than the material forming the bracket portion 208. Whereas the bracket portion 208 may comprise substantially a material such as a metal and may be substantially rigid, the hook portion 206 may comprise a polymer-based material having different properties. The polymer-based material may be, for example, a thermoplastic such as polyethylene, polyvinyl chloride, polystyrene, polymethyl methacrylate, acrylonitrile butadiene styrene, nylon, polylactic acid, polybenzimidazole, polycarbonate, polyether sulfone, polyoxymethylene, polyether ether ketone, polyetherimide, polyphenylene oxide, polyphenylene sulfide, polyvinylidene fluoride, polytetrafluoroethylene and the like, combinations thereof in any suitable proportions, or others. The polymer-based material may be, alternatively or in addition, a silicone-based plastic, phenolics, or any other suitable material. In embodiments, the material forming the hook portion 206 is not polymer-based but rather is any suitable material.

In embodiments, the hook portion 206 may be formed of material that is more flexible than the material forming the bracket portion 208. By forming the hook portion 206 of more flexible material than the bracket portion 208, the risk of damage to the casing material is reduced and higher throughputs can be accommodated. The material forming the hook portion 206 may be flexible and soft without substantially bending and deforming in shape. In embodiments, the hook portion 206 may be formed of material that is less susceptible to long-term and/or permanent deformation than the material forming the bracket portion 208, mitigating the problem of metal hooks deforming over time under the weight of the product into different shapes that lead to manufacturing irregularities. By providing the interchangeable hook-and-bracket system according to the embodiments of the disclosure, the hook portions may provide desired flexibility and process- or product-specific features without compromising on the desired strength and reliability of the metal bracket components.

The main body portion 213 may further define a recess 226 along at least one side of the main body portion 213. The recess 226 may serve to expose a surface of the main body portion 230 of the bracket portion 208. The recess 226 may further allow an operator to more easily grip a surface of the bracket portion 208 for engaging and disengaging the portions 208, 206.

On an interior surface of the main body portion 213, a frictional feature 207 may be defined for engaging a surface of the bracket portion 208. In embodiments, an indicium 207 may alternatively or additionally be defined at 207, indicating to an operator (such as a technician refitting the food-processing system 100 for a different product) whether the hook portion 206 is engaged with the bracket portion 208. In other embodiments, a resilient feature such as a button may be defined in or by a thickness of the hook portion 206 and may correspond to an analogous engagement feature on the bracket portion.

The main body portion 213 can further define a window or aperture 216 through a thickness of the main body portion 213. The aperture 216 can reduce a weight or bulk of the hook portion 206, allow an operator to view indicia located on a surface of the bracket portion 208 to verify engagement of the bracket and hook portions 208, 206, and/or can allow an operator to better grip and manipulate the portions 208, 206 such as to disengage the hook 202a, 202b. The main body portion 213 may have a region of greatest width W1 proximate the aperture 216.

The extension portion 214 may extend downwardly away from the main body portion 213 of the hook portion 206. The extension portion 214 may be formed as a unitary body with the main body portion 213 and comprise a same material. As shown, conversely to the generally forward extension of the main body portion 213 from the head portion 225 of the bracket portion 208, the extension portion 214 may extend generally backwardly from the main body portion 213, such that the notch 212 is generally arranged underneath the head portion 225 of the bracket portion 208. This arrangement may advantageously provide a clearance or width W3 in which the links 117 of the strands 118 may be looped as the discharge horn 128 and conveyor 130 travel in a same direction and speed.

The end portion 210 may extend generally upwardly from the notch 212 defined between the end portion 210 and the extension portion 214. The end portion 210 may, by extending upwardly, define the hook shape of the hook portion 206 and prevent links 117 of the strands 118 from inadvertently disengaging from the hooks 202a, 202b as the hooks 202a, 202b move in the forward direction F. As shown, the notch 212 may have a width W2 configured particularly for a desired product.

In embodiments, a thickness of the hook portion 206 may vary along the hook portion 206. In embodiments, the main body portion 213 may define a greatest thickness. In other embodiments, the notch 212 may define a greatest thickness. For instance, the notch 212 may be configured to effect a desired loop shape and size by spacing individual links 117 of the strand 118 apart, this serving to create an opening of a desired size in the loop 119.

The end portion 210, the notch 212, and the extension portion 214 all may be formed as a unitary body and/or of a same material, or may be formed of different materials. In an embodiment, the notch 212 may comprise a different material than the end portion 210 and the extension portion 214. For example, the notch 212 may be formed of a low-friction material so as to mitigate strain on the sausage links 117 deposited thereon.

As described above, different hook portions 206 may correspond to a single bracket portion 208, each of the different hook portions 206 having dimensions specific to the production of a certain-dimensioned product. For instance, a hook portion 206 that can be applied for the production of bratwursts may have a larger width W2 at the notch corresponding to the larger diameter of the bratwursts compared to the width W2 of a hook portion 206 that is used for a smaller-diameter sausage such as hot dogs.

Figure 3:
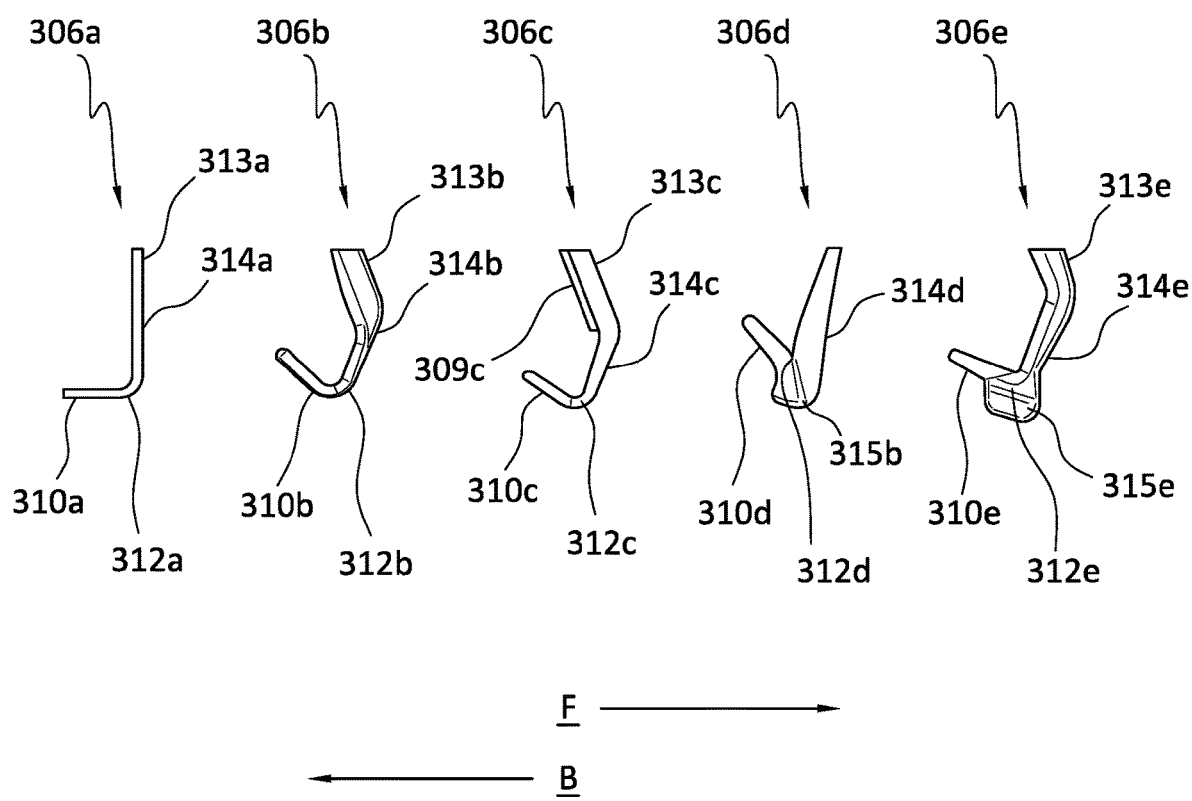
FIG. 3 is an devotional view of various embodiments of a hook according to embodiments of the disclosure.

As shown in FIG. 3, a variety of different shapes and configurations of hook portions 306a-e are shown in an elevational side view. The first embodiment corresponding to hook portion 306a comprises a hook having a right angle, as shown. The main body portion 313a and the extension portion 314a may extend in a same direction and have a unitary body. The notch 312a defined between the extension portion 314a and the end portion 310a may define a right angle. Such a hook portion 306a may be beneficial for delicate casings and/or light sausages that may be less prone to sliding off of the hook portion 306a and which may be easily lifted off of the hook portion 306a by the smoke stick.

The second embodiment corresponding to hook portion 306b by contrast may comprise a main body portion 313b distinct from and having a greater thickness than the extension portion 314b. As with the embodiments of FIG. 2, the extension portion 314b and the end portion 310b may define a notch 312b therebetween that forms a generally open clearance within which a sausage link 117 may be placed by the discharge horn 128. The end portion 310b may be formed of a different material than the extension portion 314b and the main body portion 313b.

The material forming the end portion 310b thus may have a different flexibility than the material forming the extension and main body portions 314b, 313b. In embodiments, the material forming the end portion 310b may have higher flexibility and/or bendability to facilitate the sausage links 117 more easily sliding off of the hook portion 306b when the smoke stick engages the strand 118. Conversely, the material forming the end portion 310b may have a lower flexibility to ensure that the sausage links 117 do not slide off as easily during the loading process.

The embodiment corresponding to the hook portion 306c comprises yet another variation of a hook according to the present disclosure. The hook portion 306c may comprise a main body portion 313c connected to an extension portion 314c and an end portion 310c with a notch 312c defined therebetween. As with previous embodiments, the main body portion 313c may extend generally forwardly F from a corresponding bracket portion, with the extension portion 314c extending generally backwardly B, such that a clearance is defined in which to receive sausages. The notch 312c may be arranged generally below the bracket portion notwithstanding the clearance that is so defined. Additionally, a flange or detent 309c can be defined along a backward surface of the main body portion 313c. The flange 309c may provide additional engagement with the corresponding bracket portion 308, or may advantageously provide structural support against bending in a certain direction, thereby ensuring that the hook portion 306c is flexible only along the extension portion 314c and the end portion 310c but not the main body portion 313c, for example.

The embodiment corresponding to the hook portion 306d comprises yet another variation of a hook according to the disclosure. The hook portion 306d may comprise a single extension portion 314d rather than discrete main body portions and extension portions as shown in certain of the aforementioned embodiments. The extension portion 314d may extend generally backwardly and may have a profile extending from a narrow top section to a wider bottom section. The extension portion 314d and a corresponding end portion 310d may define a notch 312d therebetween, the notch 312d advantageously, maintaining a sausage link disposed therein.

Additionally, the hook portion 306d may define a heel portion 315d downwardly of the notch 312d. The heel portion 315d may provide reinforcement against bending in unwanted directions while not inhibiting bending in desired directions. For instance, the heel portion 315d may not inhibit bending of the end portion 310d to expand a clearance in which the sausage links may hang, but may inhibit bending of the extension portion 314d from bending forwardly beyond a desired degree.

Similarly, the embodiment corresponding to the hook portion 306e comprises an extension portion 314e connecting to an end portion 310e that defines a notch 312e therebetween for engaging a strand of sausage links. A heel portion 315e is defined below the notch 312e, and may likewise prevent bending or flexing beyond a desired degree in certain directions; for instance, the heel 315e can prevent bending of the end portion 310e too far downwardly under the weight of a strand of sausages. The extension portion 314e may extend downwardly from a main body portion 313e of the hook portion 306e. The main body portion 313e may extend forwardly from the bracket portion 308 by a distance and the extension portion 314e may conversely extend backwardly from the main body portion 313e.

Any of the above-described hook-portion embodiments 306a-3 may be utilized in a food-processing system, for example, and each may correspond to a particular product, casing, throughput, or other process requirement. Additionally, combinations of one or more of the above hook-portion embodiments 306a-e may be used in a single process as deemed suitable by an operator.

Further, any one of the above-described hook portion embodiments 306a-e may be utilized with any one of the bracket portion embodiments described below. A bracket portion embodiment 408a may comprise an engagement feature 422a defined along a main body portion 430a. A bracket portion embodiment 408b may omit an engagement feature 422a in favor of an engagement feature 430b. The engagement feature 430b may be a ridge or detent. The bracket portion 408b may especially be suited to correspond to the hook portion embodiment 306c with its corresponding flange 309c. The engagement feature 430b and the flange 309c may be configured to lock together in the engaged configuration of the hook, and to be releasable upon operator action or under a predetermined weight, for example.

A bracket portion embodiment 408c may comprise a main body portion 430c that is discretized from the head portion of the bracket by a shoulder 432c. The shoulder 432c may advantageously define a stop-forming surface against which a corresponding hook portion may rest or contact in an engaged configuration. The shoulder 432c may be formed in a unitary body with the main body portion 430c or may be a separate structure adhered in any suitable way thereto. The shoulder 432c may define an engagement feature such as a slot or aperture 422c that a corresponding engagement feature on the hook portion may engage with.

The bracket portion embodiment 408d may likewise comprise a shoulder 432d that discretizes the head portion from the main body portion 430d. The shoulder 432d may define a plurality of engagement features 422d such as apertures or slots. The bracket portion embodiment 408e may comprise a shoulder 432e and main body portion 430e as with the previous embodiments. In contrast, the bracket portion 408e may comprise engagement features on one or both of a forward- and backward-facing surface of the shoulder 432e. The engagement features 422e may be resilient elements that compress upon contact with a hook portion, for example as the bracket portion 408e is inserted into a channel defined in a thickness of the hook portion. As with the embodiment of FIG. 2, the engagement features 422e may correspond to apertures or otherwise corresponding features in the hook portion.

The bracket portion embodiment 408f may comprise a shoulder 432f and a main body portion 430f. The shoulder 432f may be configured to engage the hook portion in any suitable manner, such as by defining frictional features on an outer surface thereof that may engage with an interior of a channel defined by the hook portion. Alternatively or in addition, the shoulder 430f may lock against a surface of the hook portion.

The bracket portion embodiment 408g may comprise a shoulder 432g and a main body portion 430g. The engagement features 422g of the bracket portion embodiment 408g may be configured as any suitable engagement feature, such as magnetic components that cooperate with corresponding magnetic components on a corresponding hook portion. While each of the bracket portion embodiments has been shown as extending generally forwardly from a chain, it will be appreciated that the bracket portions may extend in any, suitable direction, for any suitable length, and have any suitable components.

Figure 4:
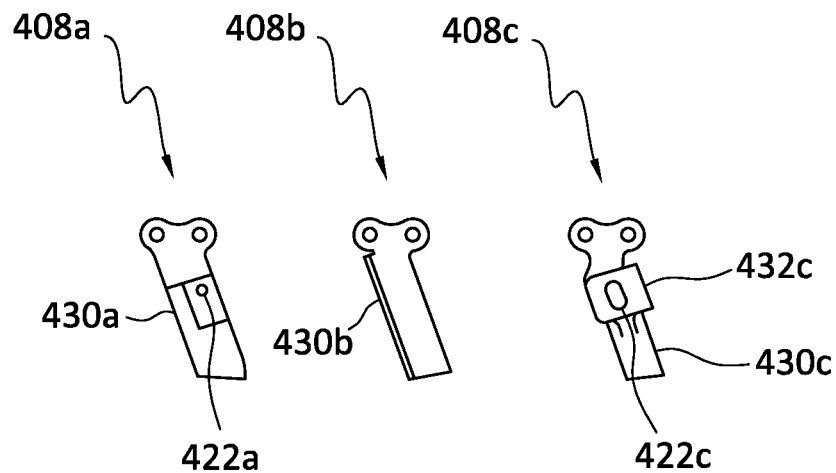
FIG. 4 is an elevational view of various embodiments of a bracket according to embodiments of the disclosure.
Figure 4:
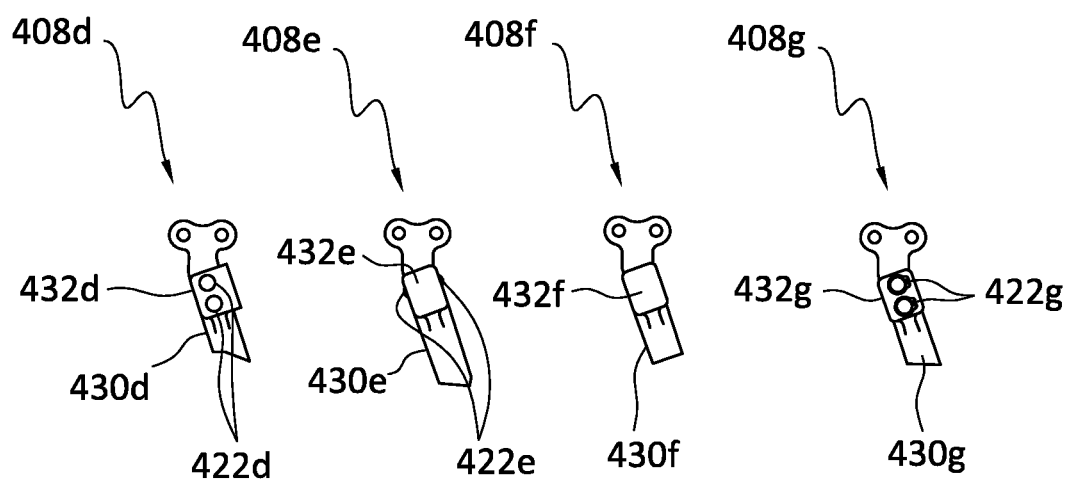

As described above, any one of the bracket portion embodiments shown in FIG. 4 may be adapted to use with any one of the hook portion embodiments shown in FIG. 3 as suitable for a particular process. A single combination of hook and bracket portions may be used to form all of the hooks on a conveyor for a particular process, or different combinations may be used on the conveyor.

A particular advantage of the embodiments of the disclosure is the configuration of engagement features of certain embodiments to create an audible noise upon proper engagement. That is, as the bracket and the hook portions are joined together in the engaged configuration, the engagement features may indicate to an operator that the engaged configuration has been attained by providing the audible noise such as a snap-in or click effect. In this manner, the process of swapping hook portions based on a different product, casing, throughput, or process requirement by an operator is further expedited and facilitated.

Figure 5:
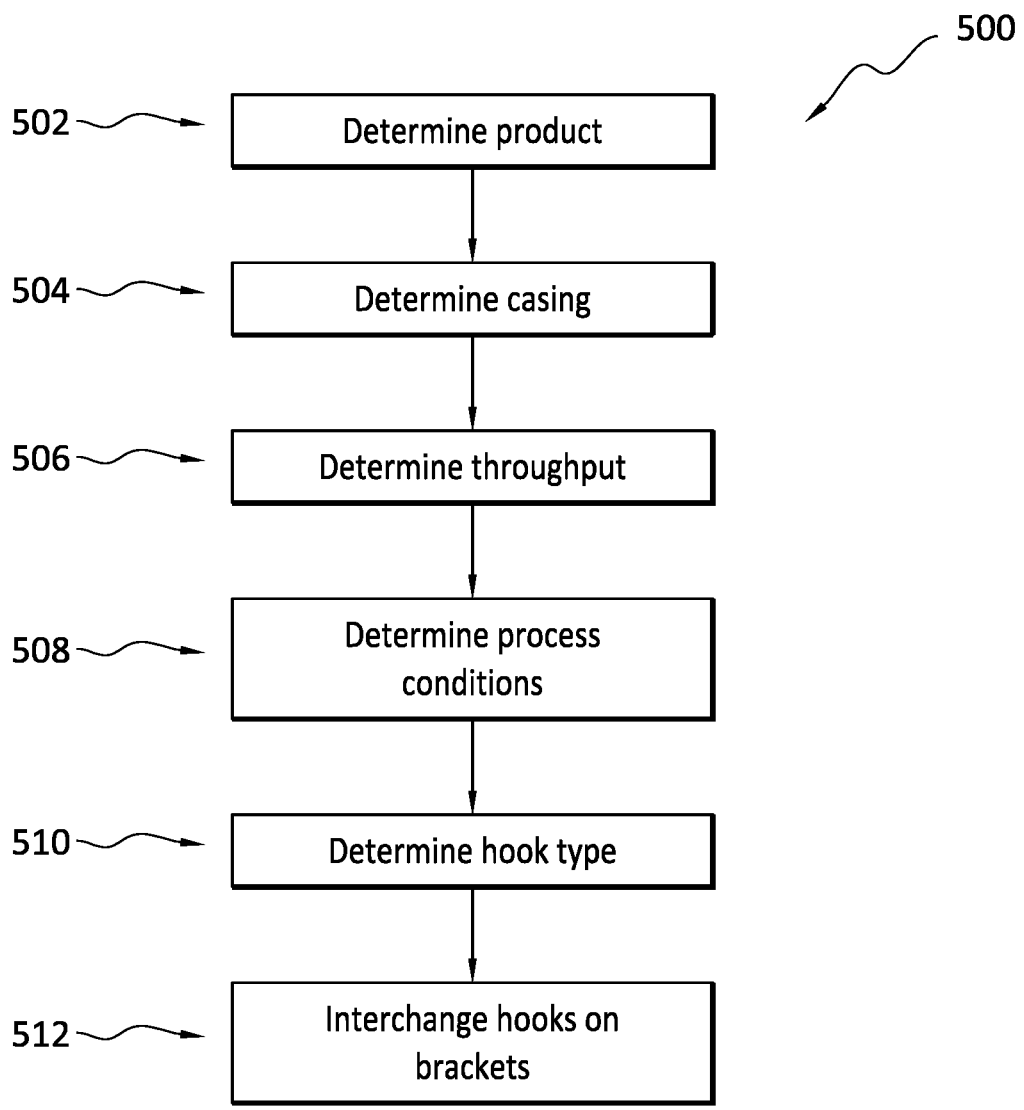
FIG. 5 is a diagram of a method of using an interchangeable hook-and-bracket system according to the disclosure.

A method for using an interchangeable hook-and-bracket system according to the embodiments is shown and described with reference to FIG. 5. A method 500 of using an interchangeable hook-and-bracket system may comprise a first step 502 of determining a product, for example a type of sausage. Based on or independently of the first step 502, the method 500 includes a second step 504 of determining a casing material or type. Based on or independently of the first and second steps 502, 504, the method 500 may include a third step 506 of determining a throughput of a food-processing system in which the interchangeable hook-and-bracket system is utilized.

A fourth step 508 of determining the process conditions to yield the desired product, casing, and throughput selected in the first, second, and third steps 502, 504, 506 then takes place. For example, process conditions pertaining to the determined product type, casing, and throughput may call for specific post-processing steps and speeds and configurations of various pieces of equipment, including a looper or discharge horn and a conveyor actuator. Each of the determinations of the first, second, third, and fourth steps 502, 504, 506, 508 may be carried out in a controller of the food-processing system. The controller may be local or remote to the food-processing system.

Based on the determined product, casing, throughput, and process conditions, a fifth step 510 of determining a hook type may be carried out. The determination of the fifth step 510 may be based on known properties of a plurality of hooks provided. For instance, for a determination of a bratwurst product having an intestine-based casing at a throughput of 10,000 sausages per hour and accompanying process conditions, a hook according to the embodiment of 306b may be determined to facilitate maximum throughput and smoke-stick placement. In other embodiments, for a determination of a hot dog product having a collagen-based casing at a throughput of 30,000 sausages per hour and accompanying process conditions, a hook according to the embodiment of FIG. 2 may be determined to facilitate maximum throughput and smoke-stick placement. Because a plurality of suitable hook portion configurations can be provided for a food-processing system, the controller or an operator may make a determination of the appropriate hook type and may adjust one or more of the foregoing steps 502, 504, 506, 508. Based on the determined hook type, the operator may carry out a sixth step 512 of interchanging hook portions on the bracket portions.

By providing an interchangeable hook-and-bracket system according to the embodiments of the disclosure, the problem of existing manufacturing systems having conveyors that are poorly suited to a product, and being difficult to adapt to a product or process requirement, is addressed. The interchangeable hook-and-bracket system embodiments advantageously provide an interchangeable hook with a bracket that is configured to cooperate with a conveyor, such as a chain. The bracket provides a robust and secure attachment to the chain, and the hook provides a consistent surface for the product to contact with reduced risk of damaging the product or of deformation over time, and with increased ease of changing out the hook based on a product or process requirement.

It will be understood that, unless a term is defined in this patent to possess a described meaning, there is no intent to limit the meaning of such term, either expressly or indirectly, beyond its plain or ordinary meaning.

It is to be understood that not necessarily all objects or advantages may be achieved under any embodiment of the disclosure. Those skilled in the art will recognize that the interchangeable hook-and-bracket system embodiments may be embodied or carried out in a manner that achieves or optimizes one advantage or group of advantages as taught without achieving other objects or advantages as taught or suggested.

The skilled artisan will recognize the interchangeability of various disclosed features. Besides the variations described, other known equivalents for each feature can be mixed and matched by one of ordinary skill in this art to make or use an interchangeable hook-and-bracket system under principles of the present disclosure. It will be understood by the skilled artisan that the features described may be adapted to other types of conveying devices and processes. Hence this disclosure and the embodiments and variations thereof are not limited to interchangeable hook-and-bracket applications for food processing, but can be utilized in any suitable process.

Although this disclosure describes certain exemplary embodiments and examples of an interchangeable hook-and-bracket system, it therefore will be understood by those skilled in the art that the present disclosure extends beyond the specifically disclosed embodiments to other alternative embodiments and/or uses of the disclosure and obvious modifications and equivalents thereof. It is intended that the present disclosure should not be limited by the particular disclosed embodiments described above.

The invention claimed is:

1. An interchangeable hook-and-bracket system for a food processing system having a conveyor system, comprising:
   at least one bracket configured to connect to the conveyor system;
   at least one hook configured to releasably connect to the at least one bracket;
   the at least one bracket comprising a rigid material; and
   the at least one hook comprising a flexible material more flexible than the rigid material;
   wherein the at least one hook forms a main body portion at which the at least one hook releasably connects to the at least one bracket, and extension portion extending downwardly and away from the main body portion, and an end portion, the end portion and the extension portion defining a clearance therebetween and a notch at a junction thereof below the clearance to form a V-shape extending between the clearance and the notch.

2. The interchangeable hook-and-bracket system of claim 1, wherein the at least one hook is formed by a polymer-based material.

3. The interchangeable hook-and-bracket system of claim 1, wherein the at least one bracket releasably connects to the at least one hook by at least one engagement feature, the at least one engagement feature extends from the at least one hook, and the at least one engagement feature is sized and configured to cooperate with at least one aperture defined by the at least one bracket.

4. The interchangeable hook-and-bracket system of claim 3, wherein the at least one hook comprises a main body portion defining a biasing element configured to engage the at least one bracket at the at least one aperture.

5. The interchangeable hook-and-bracket system of claim 3, wherein the main body portion of the at least one hook defines a channel configured to receive the main body portion of the at least one bracket.

6. The interchangeable hook-and-bracket system of claim 3, wherein the at least one bracket comprises a head portion defining at least one opening configured to engage the conveyor system.

7. The interchangeable hook-and-bracket system of claim 1, wherein the main body portion of the at least one hook has a greater thickness than the end portion.

8. The interchangeable hook-and-bracket system of claim 1, wherein the main body portion and the extension portion of the at least one hook are unitary.

9. The interchangeable hook-and-bracket system of claim 1, wherein the notch comprises a different material than the extension portion of the at least one hook.

10. The interchangeable hook-and-bracket system of claim 1, wherein the rigid material of the at least one bracket is formed by a material selected from the group consisting of a metal-based material, a fiber-filled polymer material, a polymer-based material, or a combination thereof.

11. The interchangeable hook-and-bracket system of claim 1, wherein the main body portion of the hook defines a window extending therethrough, a width of the hook at the window being greater than a width of the extension portion.

12. An interchangeable hook-and-bracket system for a food processing system having a conveyor system, comprising:
at least one bracket configured to connect to the conveyor system;
at least one hook configured to releasably connect to the at least one bracket;
the at least one bracket being formed by a material selected from the group consisting of a metal-based material, a fiber-filled polymer material, a polymer-based material, or a combination thereof; and
the at least one hook being formed by a polymer-based material more flexible than the material forming the at least one bracket;
wherein the at least one bracket releasably connects to the at least one hook by at least one engagement feature, the at least one engagement feature extends from the at least one hook, and the at least one engagement feature is sized and configured to cooperate with at least one aperture defined by the at least one bracket.

13. The interchangeable hook-and-bracket system of claim 12, wherein the at least one hook comprises a main body portion defining a biasing element configured to engage the at least one bracket at the at least one aperture.

14. The interchangeable hook-and-bracket system of claim 12, wherein the main body portion of the at least one hook defines a channel configured to receive the main body portion of the at least one bracket.

15. The interchangeable hook-and-bracket system of claim 12, wherein the main body portion of the hook defines a window extending therethrough, a width of the hook at the window being greater than a width of the extension portion.

16. The interchangeable hook-and-bracket system of claim 12, wherein the at least one hook forms a main body portion at which the at least one hook releasably connects to the at least one bracket, and extension portion extending downwardly and away from the main body portion, and an end portion, the end portion and the extension portion defining a clearance therebetween and a notch at a junction thereof below the clearance to form a V-shape extending between the clearance and the notch.

17. A food processing system comprising a conveyor system having an interchangeable hook-and-bracket system, the interchangeable hook-and-bracket system comprising:
at least one bracket configured to connect to a conveyor system;
at least one hook configured to releasably connect to the at least one bracket;
the at least one bracket comprising a rigid material; and
the at least one hook comprising a flexible material more flexible than the rigid material;
wherein the at least one bracket releasably connects to the at least one hook by at least one engagement feature, the at least one engagement feature extends from the at least one hook, and the at least one engagement feature is sized and configured to cooperate with at least one aperture defined by the at least one bracket;
wherein the at least one bracket comprises a head portion defining at least one opening configured for engaging the head portion to the conveyor system.

18. The food processing system of claim 17, wherein the at least one opening is configured to engage at least one roller of a chain of the conveyor system.

19. The food processing system of claim 17, wherein the conveyor system is a vertical conveyor system extending through a vertical plane.

20. The food processing system of claim 17, wherein the conveyor system is configured to rotate in a rotation direction at a speed corresponding to a speed of a discharge horn of a food-processing system.

* * * * *